UNITED STATES PATENT OFFICE.

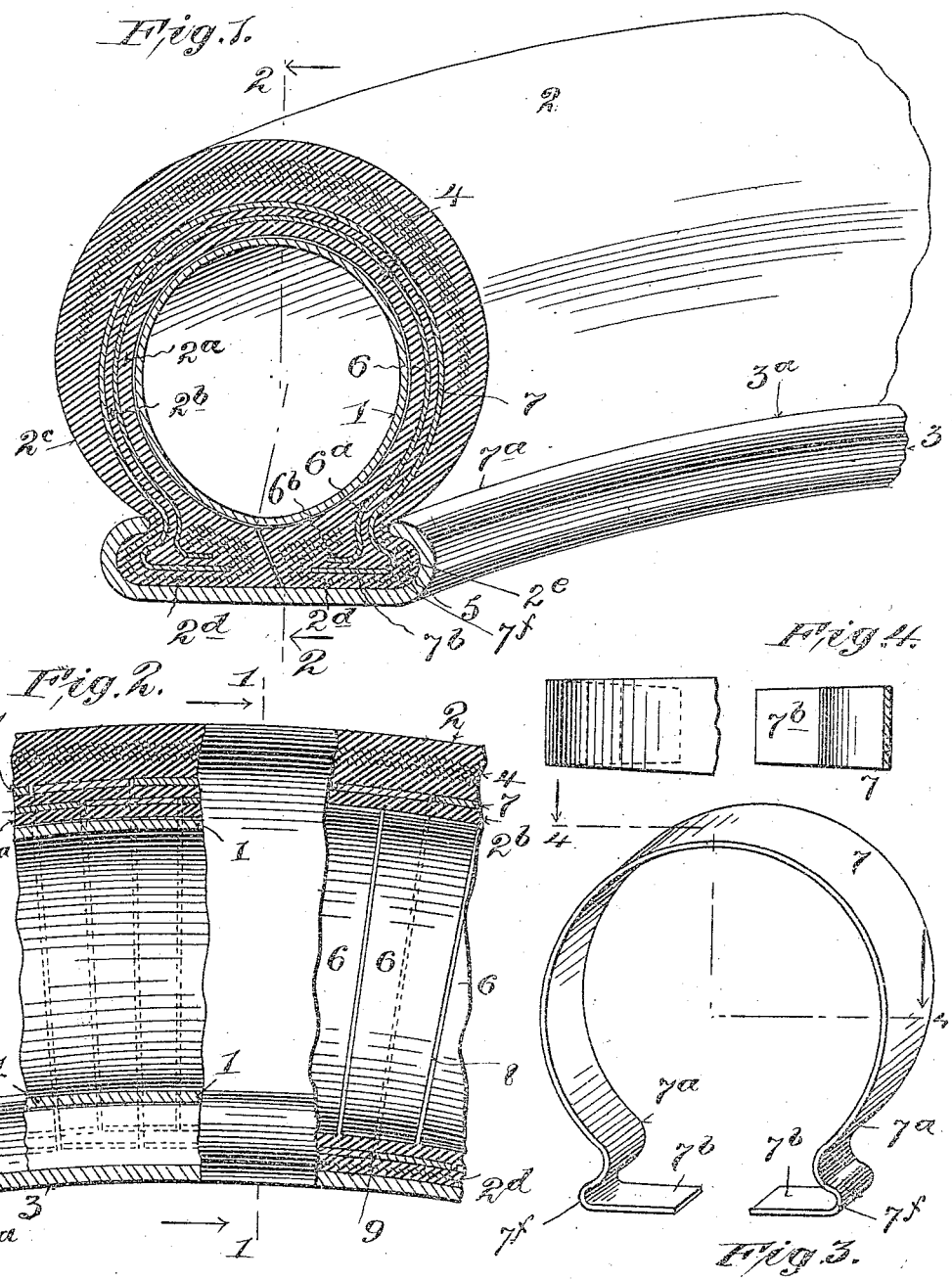

JOHN H. BLEOO, OF NEW YORK, N. Y., ASSIGNOR TO ABRAHAM B. LEVY, OF NEW YORK, N. Y.

PNEUMATIC TIRE.

No. 807,351. Specification of Letters Patent. Patented Dec. 12, 1905.

Application filed March 2, 1905. Serial No. 248,002.

*To all whom it may concern:*

Be it known that I, JOHN H. BLEOO, a citizen of the United States, residing in New York city, borough of Brooklyn, New York, have invented certain new and useful Improvements in Pneumatic Tires, of which the following is a specification.

My invention relates to improvements in tires of the pneumatic or cushion class; and the invention has for its object to afford resiliency and strength in the tire or shoe and also to prevent puncturing an inner or inflatable tube.

The invention comprises the novel details of improvement, that will be more fully hereinafter set forth and then pointed out in the claims.

Reference is to be had to the accompanying drawings, forming part hereof, wherein—

Figure 1 is a sectional view of a portion of a pneumatic tire embodying my invention fitted upon a vehicle-wheel rim. Fig. 2 is a detail side view, partly in section, at the left on the plane of the line 2 2 in Fig. 1 and partly in section at the right-hand side, disclosing in full view the inner metal protectors. Fig. 3 is a perspective view of one of the metal protectors, and Fig. 4 is a sectional view thereof substantially on the line 4 4 in Fig. 3.

Similar numerals of reference indicate corresponding parts in the several views.

My improvements are illustrated in connection with a tire of the class commonly called "detachable pneumatic tires."

At 1 is indicated an inner inflatable rubber tube, which may be of any well-known form commonly used in detachable or double-tube pneumatic tires, and at 2 is the outer shoe or casing of the tire, adapted to be attached to a wheel-rim 3 in any well-known manner. The shoe 2 may generally be constructed in any well-known manner of rubber or similar material and may have fabric embedded therein, as at 4 5, as usual.

At 6 7 are indicated series of protectors embedded in the material of the shoe 2 and shown in the form of curved flat metal strips or springs, the sides of which protectors taper inwardly or toward the axis of rotation of the tire. A series of protectors 7 overlie the protectors 6 and break joints therewith, as indicated in Fig. 2. The protectors 6 7 are shown curved at $6^a$ $7^a$ to substantially follow the curve of the shoe, and said protectors are bent laterally at $6^b$ $7^b$ at their ends, affording firm anchorage for the free ends of the protectors within the material of the shoe 2, the protectors 7 being bent outwardly at $7^f$ into the extended ribs $2^e$ at the edges of the shoe 2. The protectors 6 7 are embedded in the material of the shoe 2 in the course of manufacture, whereby there will be an inner layer of rubber $2^a$, over which lies the protectors 6, and over said protectors is a layer of rubber $2^b$, upon which are the protectors 7, and over the latter protectors is the main body of rubber $2^c$ or rubber and fabric 4, the protectors 6 7 being vulcanized in with the material of the shoe, so that the rubber will adhere securely to the metal protectors, all the parts of the shoe being thus firmly united in a single structure. By preference the edges of the corresponding protectors 6 7 are located at a short distance apart, providing spaces 8 9, through which spaces rubber passes, uniting the several parts $2^a$ $2^b$ $2^c$ of the rubber of the shoe. The fabric 5 may extend around the foot members $6^b$ $7^b$ of the protectors 6 7, as indicated in Fig. 1, to assist in strengthening the shoe at its inner separated edges.

By having the inner laterally-extending portions or feet $6^b$ $7^b$ on the protectors that overlie the rim 3 a firm bearing for the protectors is provided to prevent undue cutting of the inner webs or layers $2^d$ of the shoe, particularly when the inner tube 1 is deflated, to prevent injury from the ends of the protectors when the weight of the tire or load comes upon the deflated shoe.

By having a layer of rubber $2^b$ between the two series of protectors and by having the rubber of the shoe vulcanized upon the outer and inner surfaces of the protectors 6 7 the protectors are firmly held in place and prevented from rubbing against each other and are cushioned one from another, and a further advantage is that the movement or bending of the protectors and the contiguous portions of rubber will be coincident and equal without abrasion of the protectors upon the contiguous rubber or upon each other, the protectors being thereby also firmly braced and united in a circular direction, so as not to "creep" during travel of the tire along the ground.

When my improved tire is fitted upon a wheel-rim and the inner tube 1 is inflated, the compressed air will act in manner well known in this class of tires, and the protectors will bend, owing to the weight or strain coming upon them in a line passing from their peripheries toward their inner ends, whereby their sides may bulge outwardly, corresponding to or in manner similar to the bending of the rubber. If the air escapes from the inner tube, the protectors 6 7 will prevent total collapse of the shoe 2, as they will then bend similarly and equal to the rubber, and their inwardly-extending ends 6$^b$ 7$^b$ will resist the pressure. If the protectors are made sufficiently stiff, they will be able to carry a large part of the load without reference to the air therein. The protectors 6 7 may have an outward spring tendency at their ends, serving to normally press the inner parts 2$^d$ of the shoe 2 outwardly, thereby serving to maintain the parts 2$^d$ in contact with the flanges 3$^a$ of the rim 3.

The protectors may be used in a "single-tube" pneumatic tire by arranging them in the rubber in manner similar to the arrangement shown in the shoe 2. By making the spring-protectors sufficiently stiff the shoe or tire can be attached to a wheel-rim and used without the inner inflatable tube 1, the rubber serving to bind the protectors together and hold them upon the rim, the weight being carried by the protectors, the resiliency of the protectors acting in the manner of a cushion under the load. Such arrangement would serve for vehicles of light weight, such as bicycles and carriages.

The protectors embedded in the material of the tire or shoe, as set forth, strengthen the same and prevent bursting of the tire or shoe, and if the outer layer 2$^c$ should be cut through to the protectors 7 said layer will still adhere to the protectors.

Having now described my invention, what I claim is—

1. A tire comprising rubber having a plurality of series of spring-protectors embedded therein, spaces being provided between the edges of the protectors of each series, a layer of rubber being between the protectors, a layer of rubber within the inner protectors, a layer of rubber over the outer protectors, and rubber extending between the edges of the protectors of each series and uniting the adjacent layers of rubber, the rubber being vulcanized upon the protectors, substantially as described.

2. A tire-shoe having ribs along its outer edges, combined with curved springs embedded in the material of the shoe, said springs extending along the tread and sides of the shoe and having inwardly-bent foot portions overlying a rim.

3. A tire-shoe having ribs along its outer edges, combined with curved springs embedded in the material of the shoe, said springs extending along the tread and sides of the shoe and having their end portions bent outwardly into the ribs of the shoe, said springs also having inwardly-bent foot portions overlying a rim, substantially as described.

4. A tire-shoe having ribs along its outer edges, combined with a plurality of series of springs embedded in the material of the shoe, one series of springs overlapping the other series, said springs having inwardly-bent flat foot portions at their ends.

5. A tire-shoe having ribs along its outer edges, combined with a plurality of series of springs embedded in the material of the shoe, one series of springs overlapping the other series, said springs being bent at their ends, the outer springs extending into said ribs, said springs also extending inwardly at their ends over a rim, substantially as described.

J. H. BLEOO.

Witnesses:
T. F. BOURNE,
M. HOLLINGSHEAD.